United States Patent
Agarwal et al.

(10) Patent No.: US 11,044,187 B2
(45) Date of Patent: Jun. 22, 2021

(54) SYSTEM, METHOD AND NODES FOR PERFORMANCE MEASUREMENT IN SEGMENT ROUTING NETWORK

(71) Applicant: Huawei Technologies Co., Ltd., Guangdong (CN)

(72) Inventors: Gaurav Agarwal, Gurgaon (IN); Anil Kumar Srirangapatna Nagesh, Bengaluru (IN); Vinod Kumar Selvaraj, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/003,632

(22) Filed: Jun. 8, 2018

(65) Prior Publication Data

US 2018/0295049 A1  Oct. 11, 2018

Related U.S. Application Data

(63) Continuation of application No. PCT/CN2016/108651, filed on Dec. 6, 2016.

(30) Foreign Application Priority Data

Dec. 9, 2015  (IN) .......................... 6579/CHE/2015

(51) Int. Cl.
*H04L 12/26* (2006.01)
*H04L 12/701* (2013.01)
*H04L 12/24* (2006.01)

(52) U.S. Cl.
CPC .......... *H04L 43/50* (2013.01); *H04L 41/5067* (2013.01); *H04L 43/06* (2013.01);
(Continued)

(58) Field of Classification Search
CPC ..... H04L 43/08; H04L 43/106; H04L 41/046; H04L 41/5067; H04L 43/06; H04L 43/50; H04L 45/00
See application file for complete search history.

(56) References Cited

U.S. PATENT DOCUMENTS 7,359,964 B2 * 4/2008 Roe .......................... H04L 29/06
709/224
8,045,475 B2 * 10/2011 Mohan ................ H04L 41/5012
370/241
(Continued)

FOREIGN PATENT DOCUMENTS

CN    101582878 A    11/2009
CN    101682537 A    3/2010
(Continued)

OTHER PUBLICATIONS

Sarvesh Kulkarni et al., "A scalable architecture for performance measurement in broadband networks", 2015 IEEE Conference on Standards for Communications and Networking(CSCN), IEEE, Oct. 28, 2015, pp. 174-180, XP032856162.
(Continued)

*Primary Examiner* — Melanie Jagannathan
(74) *Attorney, Agent, or Firm* — Conley Rose, P.C.

(57) ABSTRACT

The present disclosure provides performance measurement (PM) for segment routing (SR) with flexibility to have PM information piggy backed, preferably using service function chaining (SFC) to data packet itself or dedicate PM packet avoiding change in data packet. A performance measured flow (PMF) identifier is used by transit/egress nodes for statistics collection for a given PMF. The PMF identifier is carried in the piggy backed information without the use of separate SR label. The Piggy backed information carries the node information role of the node used by transit egress nodes to collect statistics for a given PM segment. The
(Continued)

present disclosure collects the statistics for multiple segments and multiple PM types using a metadata present in single received packet, saving bandwidth and making PM calculation fast and more accurate. Using the present disclosure, the timer/configuration requirement per performance measurement instance from transit/egress node is avoided.

22 Claims, 15 Drawing Sheets

(52) U.S. Cl.
CPC .............. *H04L 43/08* (2013.01); *H04L 45/00* (2013.01); *H04L 41/046* (2013.01); *H04L 43/026* (2013.01); *H04L 43/10* (2013.01)

(56) References Cited

U.S. PATENT DOCUMENTS

| | | | | |
|---|---|---|---|---|
| 8,229,705 | B1* | 7/2012 | Mizrahi | H04L 43/08 370/236.2 |
| 9,036,656 | B1* | 5/2015 | Parthasarathy | H04L 45/50 370/474 |
| 9,450,854 | B2* | 9/2016 | Nadeau | H04L 43/12 |
| 2008/0049615 | A1* | 2/2008 | Bugenhagen | H04L 47/22 370/230.1 |
| 2008/0273518 | A1 | 11/2008 | Pratt et al. | |
| 2009/0232005 | A1* | 9/2009 | Mohan | H04L 43/10 370/241.1 |
| 2011/0122871 | A1* | 5/2011 | Shenoi | H04L 45/00 370/389 |
| 2013/0010600 | A1 | 1/2013 | Jocha et al. | |
| 2013/0117434 | A1 | 5/2013 | Chakrabarti et al. | |
| 2014/0280904 | A1 | 9/2014 | Bugenhagen | |
| 2015/0163155 | A1 | 6/2015 | Beheshti-Zavareh et al. | |
| 2020/0044943 | A1* | 2/2020 | Bor-Yaliniz | H04L 41/5067 |
| 2020/0153732 | A1* | 5/2020 | Negi | H04L 47/34 |

FOREIGN PATENT DOCUMENTS

| | | | |
|---|---|---|---|
| CN | 104429029 | A | 3/2015 |
| EP | 1734690 | A1 | 12/2006 |

OTHER PUBLICATIONS

Kumar et al.; "Performance Measurement Architecture for SFC"; draft-agv-sfc-performance-measurement-architecture-00; SFC Working Group; Dec. 11, 2015; 19 pages.
Chen et al.; "IP Flow Performance Measurement Framework"; draft-chen-ippm-coloring-based-ipfpm-framework-04; Network Working Group; Jul. 6, 2015;16 pages.
Chen et al.; "IP Flow Performance Measurement Report"; draft-chen-ippm-ipfpm-report-00; Network Working Group; Jul. 3, 2014; 13 pages.
Shalunov et al.; "A One-way Active Measurement Protocol (OWAMP)"; Network Working Group; rfc4656; Sep. 2006; 56 pages.
Hedayat et al.; "A Two-Way Active Measurement Protocol (TWAMP)"; Network Working Group; rfc5357; Oct. 2008; 26 pages.
Frost et al.; "Packet Loss and Delay Measurement for MPLS Networks"; Internet Engineering Task Force (IETF); rfc6374; Sep. 2011, 52 pages.
Filsfils et al.; "Segment Routing Architecture"; draft-ietf-spring-segment-routing-06; Network Working Group; Oct. 14, 2015; 24 pages.
Quinn et al.; "Network Service Header"; draft-ietf-sfc-nsh-01.txt; Network Working Group; Jul. 23, 2015, 43 pages.
Halpern et al.; "Service Function Chaining (SFC) Architecture"; draft-ieff-sfc-architecture-11; Network Working Group; Jul. 24, 2015; 30 pages.
Rosen et al.; "Multiprotocol Label Switching Architecture"; Network Working Group; rfc3031; Jan. 2001; 61 pages.
Rosen et al.; "MPLS Label Stack Encoding"; Network Working Group; rfc3032; Jan. 2001; 23 pages.
Kompella et al.; "Allocating and Retiring Special-Purpose MPLS Labels"; Internet Engineering Task Force (IETF); rfc7274; Jun. 2014; 11 pages.
Deng et al.; "Use-cases for Passive Measurement in Wireless Networks"; draft-deng-ippm-passive-wireless-usecase-01; LMAP Working Group; Jan. 11, 2015; 10 pages.
Machine Translation and Abstract of Chinese Publication No. CN101582878, Nov. 18, 2009, 14 pages.
Foreign Communication From A Counterpart Application, Chinese Application No. 201680071789.7, Chinese Search Report dated Nov. 20, 2019, 2 pages.
Foreign Communication From A Counterpart Application, Chinese Application No. 201680071789.7, Chinese Office Action dated Nov. 29, 2019, 8 pages.

* cited by examiner

SYSTEM, METHOD AND NODES FOR PERFORMANCE MEASUREMENT IN SEGMENT ROUTING NETWORK

CROSS-REFERENCE TO RELATED APPLICATIONS

This application is a continuation of International Application No. PCT/CN2016/108651, filed on Dec. 6, 2016, which claims priority to Indian Patent Application No. 6579/CHE/2015, filed on Dec. 9, 2015. The disclosures of the aforementioned applications are hereby incorporated by reference in their entireties.

TECHNICAL FIELD

The present subject matter described herein, in general, relates to monitoring of paths in networks, and more particularly, to systems, methods, and devices for determining measures indicative of expected quality of experience in respect of data traversing end-to-end paths across a network.

BACKGROUND

There are various scenarios in which the end-to-end performance of services delivered across a network may be important, and various ways in which good or poor end-to-end performance may manifest itself and be monitored or perceived by end-users. Various factors may affect end-to-end performance, including the performance of an end-user's own local network or a computing device therein, but unsatisfactory end-to-end performance in respect of a service is often caused by links on the route that carries the service across a network, the choice of which is generally not under the control of the end-user.

The service level agreements (SLAs) of most of the service providers also depend on the ability to measure and monitor performance metrics for packet loss and one-way and two-way delay. This measurement capability provides operators with greater visibility into the performance characteristics of their networks, thereby facilitating planning, troubleshooting, and network performance evaluation. Performance Measurement (PM) is an important tool that can not only provide Service Level Agreement (SLA) verification but facilitate in trouble shooting such as, fault localization or fault delimitation and network visualization.

However, in order to provide efficient results, the PM tool or the PM architecture needs to have some of the basic requirements, such as but not limited to that, the PM architecture should be capable for packet loss, one way delay, two way delay measurement and throughput, the PM should be capable for both active measurement and passive measurement, the PM should be possible for both end-to-end (E2E), path segment(s), service and Label-switched paths (LSP) like path-to-path (P2P), P2MP, MP2MP. In case of Path Segment, it can be Hop by Hop, the PM should be used for both continuous/proactive and selective/on-demand measurement, the applicability of PM should be to any Layer 3 technology like IPv4 or IPv6 also should work for non IP Traffic like TDM traffic. Also, the PM should be LSP agnostic, i.e. it should be able to work for any type of LSP including best effort, TE etc. The PM should be capable of working for all standard LSP behaviors including PHP. The out of ordering should not impact the PM calculation especially for ECMP cases. Furthermore, the PM architecture should be capable of providing flexibility to have PM information with data or control packets.

In order to satisfy the above requirements of PM or PM architecture, the prior-art provides various PM mechanisms. The one-way active measurement protocol (OWAMP) as discussed in RFC4656 and two-way active measurement protocol (TWAMP) as discussed in RFC5357 are tools only limited to active performance measurement and thereby not enough or applicable to many scenarios as provided in I-D.deng-ippm-passive-wireless-usecase. The multiprotocol label switching (MPLS) PM protocol as discussed in RFC6374 for packet loss could be considered an example of passive performance measurement method. The MPLS PM protocol operates by periodically inserting auxiliary Operations, Administration and Maintenance (OAM) packets based on which the traffic is delimited by the OAM packets into consecutive blocks, and the receivers count the packets and calculate the packets loss each block. Coloring based IP PM as discussed in the draft-chen-ippm-coloring-based-ipfpm-framework-04 is another example of passive performance measurement.

In spite of the above mentioned solution available in the prior-art, the prior-art has certain drawbacks as they are limited to either active performance measurement or to passive measurement, and thereby not enough or applicable to most of the requirements of the PM to achieve efficient results. Also, most of the prior-art techniques are not applied in cases for out of order scenario i.e., where the channel is an LSP and the LSP label at the receiver is either nonexistent in case when penultimate hop popping (PHP) is used on the LSP, or fails to identify a unique sending node and holds for LSPs based on the Label Distribution Protocol (LDP). Further, most of the prior-art techniques are only applicable for IP Network and cannot support PM requirements for segment routing.

To summarize the technical problems available in the prior-art, there is a dire need of new performance measurement architecture that satisfies the requirement of PM or PM architecture mentioned above and thereby by efficiently and effectively determines the performance measurement of a segment in a network.

SUMMARY

This summary is provided to introduce concepts related to systems, methods and nodes for performance measurement using segment routing, and the same are further described below in the detailed description. This summary is not intended to identify essential features of the claimed subject matter nor is it intended for use in determining or limiting the scope of the claimed subject matter.

A main objective of the present disclosure is to solve the technical problem as recited above by providing a system, method, and devices for performance measurement architecture that satisfies the requirement of PM or PM architecture mentioned above and thereby by efficiently and effectively determine the performance measurement of a segment in a network.

Another objective of the present disclosure is to provide performance measurement architecture for segment routing based network, which suffice the basic PM requirement and overcome the limitation of existing PM techniques.

Another objective of the present disclosure is to provide system, method, and devices for performance measurement architecture by measurement of packet loss, one way delay, two way delay and throughput.

Another objective of the present disclosure is to provide system, method, and devices for performance measurement architecture for performance measurement capability in case of both active measurement and passive measurement.

Another objective of the present disclosure is to provide system, method, and devices for performance measurement architecture in case of E2E and path segment(s) like Hop by Hop, Service and LSP type like P2P, P2MP, MP2MP.

Another objective of the present disclosure is to provide system, method, and devices for performance measurement architecture in case of continuous/proactive and selective/on-demand performance measurement.

Another objective of the present disclosure is to provide system, method, and devices for performance measurement architecture configured and adapted to be applicable to any Layer 3 technology like IPv4 or IPv6 also should work for non IP Traffic like TDM traffic.

Another objective of the present disclosure is to provide system, method, and devices for performance measurement architecture configured to be LSP Agnostic, i.e., capable to work for any type of LSP including Best Effort, TE, etc.

Another objective of the present disclosure is to provide system, method, and devices for performance measurement architecture configured to work for all standard LSP behaviors including PHP.

Another objective of the present disclosure is to provide system, method, and devices for performance measurement architecture configured to work in cases of out of ordering scenarios i.e., the out of ordering scenarios does not impact the PM Calculation especially for ECMP cases.

Yet another objective of the present disclosure is to provide system, method, and devices for performance measurement architecture that is capable and flexible to carry information in data or control packet.

Still another objective of the present disclosure is to provide system, method, and devices for performance measurement architecture based on service function chaining (SFC) together with network service header (NSH) header for implementing the PM architecture, without impacting the MPLS forwarding architecture. In this case, the SR Service Label will be carried to instruct the MA about the presence of piggy backed information as NSH metadata at the end of MPLS label stack. The NSH in this case will carry all the necessary information required by MA to carry out the PM.

Accordingly, in one implementation, the present disclosure provide a system, method, and device for performance measurement architecture wherein at least one ingress node is configured to program the data packet to instruct at least one node in the network to collect the PM statistics information. The node sends the statistics information to at least one collector and the collector uses this information for measuring the performance. The PM information can be carried in data packet or separate PM control packets can be constructed to achieve the communication.

In one implementation, the present disclosure provides a system, determining performance measures associated with at least one segment in respect of communication segments in a communication network. The system comprises at least one ingress node, at least one the measurement agent, and at least one collector.

The ingress node configured to define at least a performance measurement instance containing at least a flow for determining performance measures or at least one performance measurement (PM) segment of the flow in respect of the communication segments or both, piggy back data associated with the performance measurement (PM) segment in at least one packet, wherein the data contained in at least performance measurement metadata of the packet, the performance measurement metadata comprises at least a performance measured flow (PMF) identifier, or a block identifier, or at least one measurement agent details, or an associated role of the measurement agent with PM type, or a collected statistics information, or combination thereof; and transmit the packet containing the performance measurement metadata to the measurement agent (MA).

The measurement agent is configured to receive the packet containing the performance measurement metadata associated with the performance measurement (PM) segment, identify at least role of the measurement agent based on the performance measurement metadata received, execute the performance measurement based on the role identified, thereby collect statistics for the performance measurement (PM) segment of the flow, and at least one PM type based on at least the performance measurement metadata received, wherein the statistics is collected against at least one key selected from the PMF identifier or the block identifier or the associated role of the measurement agent with PM type, or the collected statistics information, or any combination thereof, received in the performance measurement metadata, and report the key and an information associated with the measurement agent to at least one collector.

The collector is configured to receive the key and the information associated with the measurement agent, and thereby collects and accumulates the statistics for at least measurement timeslot of a PM instance as specified in the key. The collector then determines the performance measures associated with the segment in respect of the communication segments based on the statistics collected and accumulated.

In one implementation, the present disclosure provides a node for transmitting at least the data associated with the performance measurement (PM) segment selected from at least one segment in respect of communication segments in a communication network. The node comprises a processor, and a memory coupled to the processor for executing a plurality of modules present in the memory. The plurality of modules comprises a receiving module, detection module, an identification module, an execution module, and a reporting module.

The receiving module is configured to receive at least one packet, a detection module. The detection module is configured to detect presence of at least performance measurement metadata associated with the performance measurement (PM) segment, the performance measurement metadata comprises at least a performance measured flow (PMF) identifier, or a block identifier, or at least one measurement agent details, or an associated role of the measurement agent with PM type, or a collected statistics information, or combination thereof, contained in the packet. The identification module is configured to identify at least role of the node based on the performance measurement metadata detected. The execution module is configured to execute the performance measurement based on the role identified, thereby collect statistics for the performance measurement (PM) segment of the flow, and at least one PM type based on at least the performance measurement metadata received, wherein the statistics is collected against at least one key selected from the PMF identifier or the block identifier or the associated role of the measurement agent with PM type, or the collected statistics information, or any combination thereof, received in the performance measurement metadata. The reporting module configured to report the key and information associated with the node to at least one other node to determining performance measures associated with the segment in respect of communication segments in the communication network.

In one implementation, the present disclosure provides a node for determining performance measures associated with at least one segment in respect of communication segments in a communication network. The node comprises a processor and a memory coupled to the processor for executing a plurality of modules present in the memory. The plurality of modules comprises a receiving module, a collecting module, and a determination module.

The receiving module is configured to receive at least a key and a transmitting node details transmitting the data associated with the performance measurement (PM) segment selected from the segment, the key is at least a performance measured flow (PMF) identifier, or a block identifier, or at least one transmitting node details, or an associated role of the transmitting node with PM type, or a collected statistics information, or combination thereof. The collecting module is configured to collect and accumulate the statistics for a measurement timeslot of a PM instance as specified in the key. The determination module is configured to determine the performance measures associated with the segment in respect of the communication segments based on the statistics collected and accumulated.

In one implementation, the present disclosure provides a method of determining performance measures associated with at least one segment in respect of communication segments in a communication network. The method comprises:
defining, by at least one ingress node, at least a performance measurement instance containing at least a flow for determining performance measures or at least one performance measurement (PM) segment of the flow in respect of the communication segments or both;
piggy backing, by the ingress node, data associated with the performance measurement (PM) segment in at least one packet, wherein the data contained in at least performance measurement metadata of the packet, the performance measurement metadata comprises at least a performance measured flow (PMF) identifier, or a block identifier, or at least one measurement agent details, or an associated role of the measurement agent with PM type, or a collected statistics information, or combination thereof;
transmitting, by the ingress node, the packet containing the performance measurement metadata to at least one measurement agent (MA);
receiving, by the measurement agent, the packet containing the performance measurement metadata associated with the performance measurement (PM) segment;
identifying, by the measurement agent, at least role of the measurement agent based on the performance measurement metadata received;
executing, by the measurement agent, the performance measurement based on the role identified, thereby collect statistics for the performance measurement (PM) segment of the flow, and at least one PM type based on at least the performance measurement metadata received, wherein the statistics is collected against at least one key selected from the PMF identifier or the block identifier or the associated role of the measurement agent with PM type, or the collected statistics information, or any combination thereof, received in the performance measurement metadata;
reporting, by the measurement agent, the key and an information associated with the measurement agent to at least one collector;
receiving, by the collector, the key and the information associated with the measurement agent, and thereby collect and accumulate the statistics for at least measurement timeslot of a PM instance as specified in the key; and
determining, by the collector, the performance measures associated with the segment in respect of the communication segments based on the statistics collected and accumulated.

In one implementation, the present disclosure provides a method, performed by at least one node, for transmitting at least the data associated with the performance measurement (PM) segment selected from at least one segment in respect of communication segments in a communication network. The method comprises:
receiving at least one packet;
detecting presence of at least performance measurement metadata associated with the performance measurement (PM) segment, the performance measurement metadata comprises at least a performance measured flow (PMF) identifier, or a block identifier, or at least one measurement agent details, or an associated role of the measurement agent with PM type, or a collected statistics information, or combination thereof, contained in the packet;
identifying at least role of the node based on the performance measurement metadata detected;
executing the performance measurement based on the role identified, thereby collect statistics for the performance measurement (PM) segment of the flow, and at least one PM type based on at least the performance measurement metadata received, wherein the statistics is collected against at least one key selected from the PMF identifier or the block identifier or the associated role of the measurement agent with PM type, or the collected statistics information, or any combination thereof, received in the performance measurement metadata;
reporting the key and an information associated with the node to at least one other node to determining performance measures associated with the segment in respect of communication segments in the communication network.

In one implementation, the present disclosure provides a method, performed by at least one node, for determining performance measures associated with at least one segment in respect of communication segments in a communication network. The method comprises:
receiving at least a key and a transmitting node details, the key is at least a performance measured flow (PMF) identifier, or a block identifier, or at least one transmitting node details, or an associated role of the transmitting node with PM type, or a collected statistics information, or combination thereof;
collecting and accumulating the statistics for an measurement timeslot of a PM instance as specified in the key; and
determining the performance measures associated with the segment in respect of the communication segments based on the statistics collected and accumulated.

In contrast to the prior-art techniques, available if any, the present disclosure provides performance measurement for segment routing with flexibility to have PM information either piggy backed to data packet itself thereby saving on bandwidth or dedicate PM packet avoiding change in data packet. A new PMF identifier is defined to be used by transit/egress nodes for statistics collection for a given PMF (can be applicable for SR-BE, SR-TE, P2P, P2MP, MP2MP services/LSPS). The PMF Identifier is carried in the piggy backed information without the use of separate SR label, thereby saving on the label space and reducing load due to label exchange. The present disclosure is configured for performance measurement for any given segment which can be discrete or continuous segments, or can be from any node to any node in the flow. The Piggy backed information carries the node information role of the node used by Transit Egress Nodes to collect statistics for a given PM segment. The present disclosure enables to collect statistics for multiple segments and multiple PM types using a metadata present in single received packet, saving bandwidth and making PM calculation fast and more accurate, rather than having 1 packet per PM segment/PM Type. The present disclosure provides the sufficient information to collector directly hence, the timer/configuration requirement per performance measurement instance from transit/egress node is avoided.

Also, the present disclosure provides realization using service function chaining, without affecting the current MPLS forwarding architecture. The present disclosure uses the SR service function label to indicate the presence of NSH metadata which is configured to carry the piggy backed PM information.

The various options and preferred embodiments referred to above in relation to the first implementation are also applicable in relation to the other implementations.

BRIEF DESCRIPTION OF THE ACCOMPANYING DRAWINGS

The detailed description is described with reference to the accompanying figures. In the figures, the left-most digit(s) of a reference number identifies the figure in which the reference number first appears. The same numbers are used throughout the drawings to refer like features and components.

Figure 14:
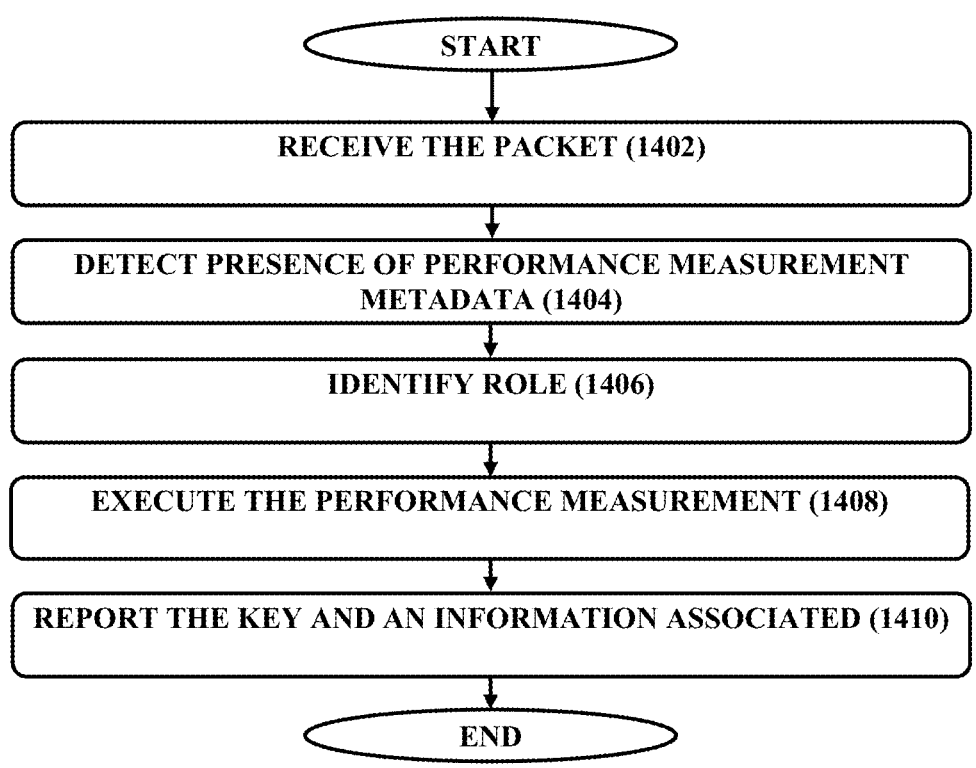
Figure 15:
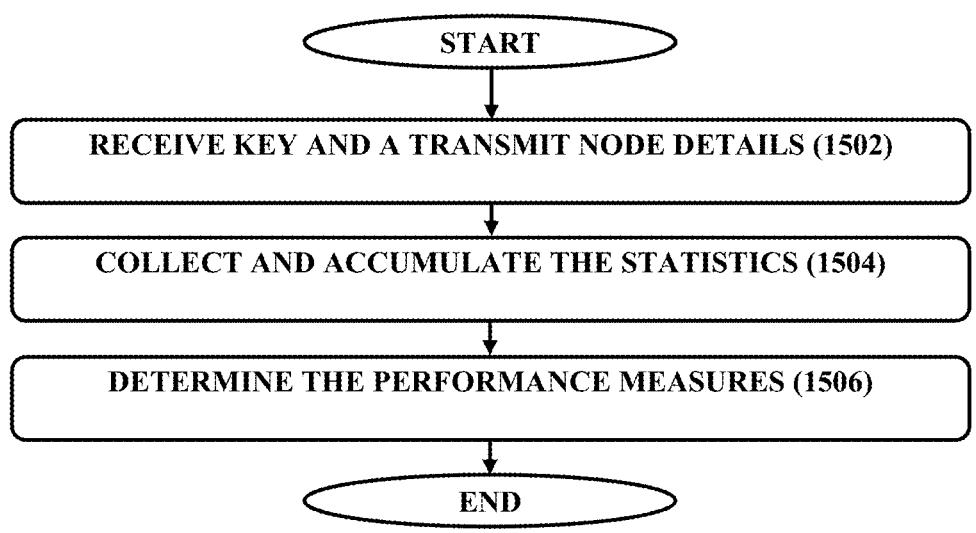

FIG. 14 illustrates a method, performed by at least one node, for transmitting at least the data associated with the performance measurement (PM) segment selected from at least one segment in respect of communication segments in a communication network, in accordance with an embodiment of the present subject matter; and FIG. 15 illustrates a method, performed by at least one node, for determining performance measures associated with at least one segment in respect of communication segments in a communication network, in accordance with an embodiment of the present subject matter.

It is to be understood that the attached drawings are for purposes of illustrating the concepts of the disclosure and may not be to scale.

DETAILED DESCRIPTION OF THE PRESENT DISCLOSURE

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The disclosure can be implemented in numerous ways, as a process, an apparatus, a system, a composition of matter, a computer readable medium such as a computer readable storage medium or a computer network wherein program instructions are sent over optical or electronic communication links. In this specification, these implementations, or any other form that the disclosure may take, may be referred to as techniques. In general, the order of the steps of disclosed processes may be altered within the scope of the disclosure.

A detailed description of one or more embodiments of the disclosure is provided below along with accompanying figures that illustrate the principles of the disclosure. The disclosure is described in connection with such embodiments, but the disclosure is not limited to any embodiment. The scope of the disclosure is limited only by the claims and the disclosure encompasses numerous alternatives, modifications and equivalents. Numerous specific details are set forth in the following description in order to provide a thorough understanding of the disclosure. These details are provided for the purpose of example and the disclosure may be practiced according to the claims without some or all of these specific details. For the purpose of clarity, technical material that is known in the technical fields related to the disclosure has not been described in detail so that the disclosure is not unnecessarily obscured.

Systems, methods and nodes for performance measurement using segment routing are disclosed.

While aspects are described for systems, methods and nodes for performance measurement using segment routing, the present disclosure may be implemented in any number of different computing systems, environments, and/or configurations, the embodiments are described in the context of the following exemplary systems, apparatus, and methods.

In one implementation, the present disclosure provides performance measurement architecture for segment routing based network with flexibility to have PM information either piggy backed to data packet itself thereby saving on bandwidth or dedicate PM packet avoiding change in data packet. A new PMF identifier is defined to be used by transit/egress nodes for statistics collection for a given PMF (can be applicable for SR-BE, SR-TE, P2P, P2MP, MP2MP services/LSPS). The PMF Identifier is carried in the piggy backed information without the use of separate SR label, thereby saving on the label space and reducing load due to label exchange. The present disclosure is configured for performance measurement for any given segment which can be discrete or continuous segments, or can be from any node to any node in the flow. The Piggy backed information carries the node information role of the node used by Transit Egress Nodes to collect statistics for a given PM segment. The present disclosure enables to collect statistics for multiple segments and multiple PM types using a metadata present in single received packet, saving bandwidth and making PM calculation fast and more accurate, rather than having 1 packet per PM segment/PM Type. The present disclosure provides the sufficient information to collector directly hence, the timer/configuration requirement per performance measurement instance from transit/egress node is avoided.

Figure 1:
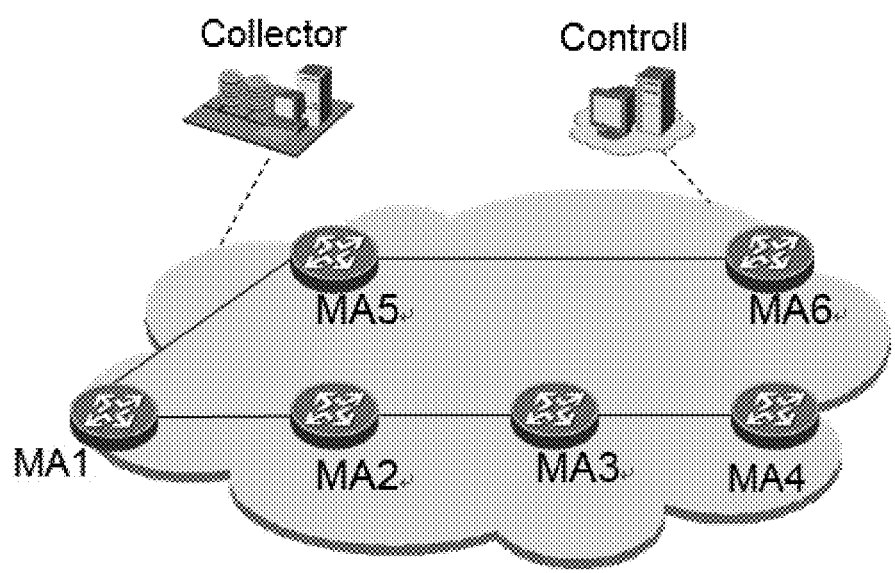
FIG. 1 illustrates a typical PM Network Architecture as implemented in the prior-art.

Referring now to FIG. 1, a typical PM network architecture as implemented in the prior-art is illustrated. As shown in FIG. 1, the ingress node may program the data packet to instruct the Measurement Agent (MA) to collect the PM statistics information. The MA sends the statistics information to at least one collector. The collector uses this information for measuring the performance. PM information can be carried in data packet or separate PM control packets can be constructed. The PMF identifier, the block identifier, the MA node and the role associated with the MA node with PM type is piggy backed in the data packet for passive OAM, and should be present in test packet for active OAM. The PMF identifier, block identifier, the MA node and the role associated with the MA node with PM type, and the collected statistics information is communicated from MA to collector.

As shown in FIG. 1, following network components are used in the typical PM network architecture.
- Controller: Responsible for configuring the PM Instance. Optionally, the PM instance may be configured manually at the ingress in which case controller is not required.
- Collector: Responsible for collecting the PM data from MA. If required any MA device can also function as a collector. It may be understood by the person skilled in the art that the controller and collector may be a single device too. It depends on deployment.
- MA: Measurement Agents responsible for collecting the PM Data.
- Ingress: Program the data packet to instruct the MAs to collect the PM Statistics Information As conventionally known, the PM Metadata parameters that are communicate by the ingress to MA or MA to collector may include the PMF identifier, block identifier, the MA node and the role associated with the MA node with PM type. Following are the details of the The PMF Identifier PM Metadata parameters as known in the convention art.

PMF Identifier:
Purpose: For unique identification of a PMF within SR Network
Value==Node Identifier+Service/LSP Identifier
Location==In Piggybacked Data.
Action—
At Ingress: Inserted@Ingress and
At MA (Ingress/Transit/Egress): Used as a key while collecting, maintaining & reporting PM Statistics to Collector.

It may be understood by the person skilled in the art that, the PMF Identifier may be one of the Key used at MA while accumulating and reporting data. Further, the PMF identifier may be used for identification of any type of flow including P2P, P2MP, MP2MP, SR-BE, SR-TE.

Block Identifier:
Purpose: divides the flows into multiple blocks. Packets in a block have same block identifier and consecutive blocks will have different identifier. This enables the MA to collect statistics of each block of packets & report it to Collector. (Note: Block is basically an measurement timeslot of a PM instance)
Value==Integer (Max/Min Value: Configurable at Ingress, once Max value reached then value=Min Value). Value increases after configured PM Intervals.
Action:
At Ingress: Inserted@Ingress
At MA (Ingress/Transit/Egress): Used as a key while collecting, maintaining & reporting PM Statistics to Collector.

It may be understood by the person skilled in the art that, the block identifier may be one of the Key used at MA while accumulating and reporting data.

MA ID with associated role and PM type:
Purpose: To identify the entire MA for a particular flow with their roles and the type of performance measurement they need to carry out.
MA ID: TLV's in Metadata
Role and PM: Sub-TLV's in Metadata per MA ID TLV, Note: This is repeated per MA per PM Type.
Action:
At Ingress: Inserted@Ingress.
At MA (Ingress/Transit/Egress): Information is used to find out MA Role and PM type it needs to carry out. Also this information will be maintained and reported to Collector.

It may be understood by the person skilled in the art that, the MA ID with associated role and PM Type are also one of the Keys used at MA while accumulating and reporting data.

Figure 2:
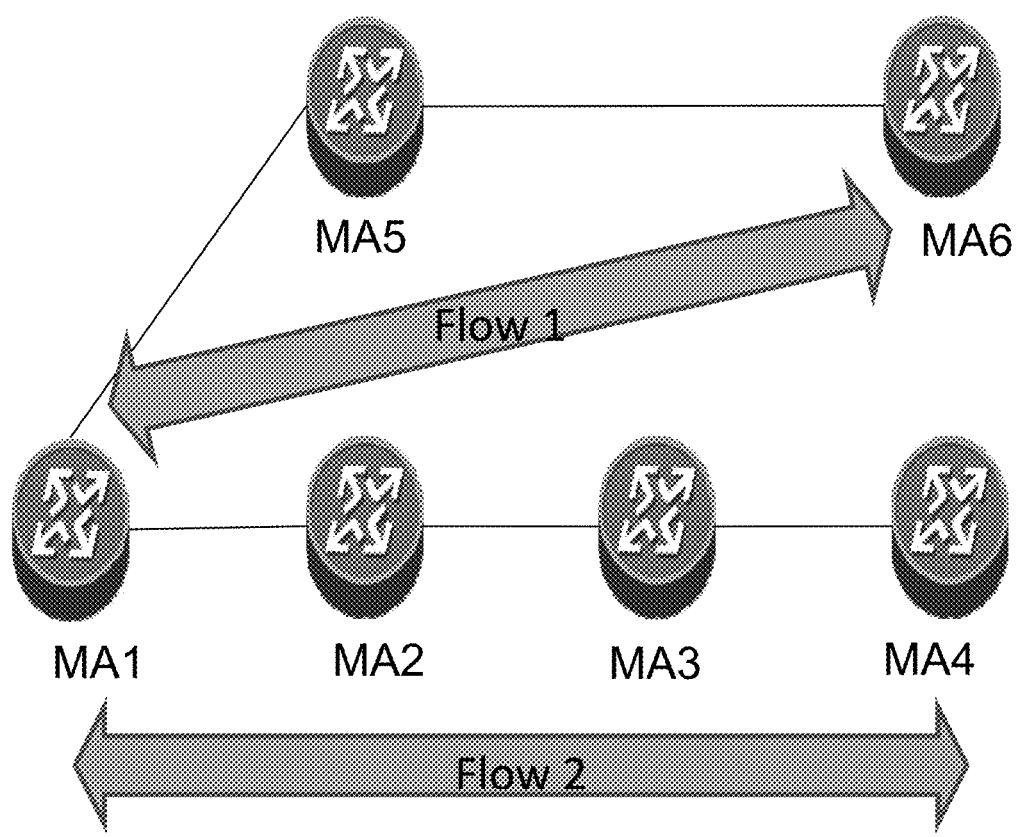
FIG. 2 illustrates the 2 LSP's which are 2 different network flows.
Figure 3:
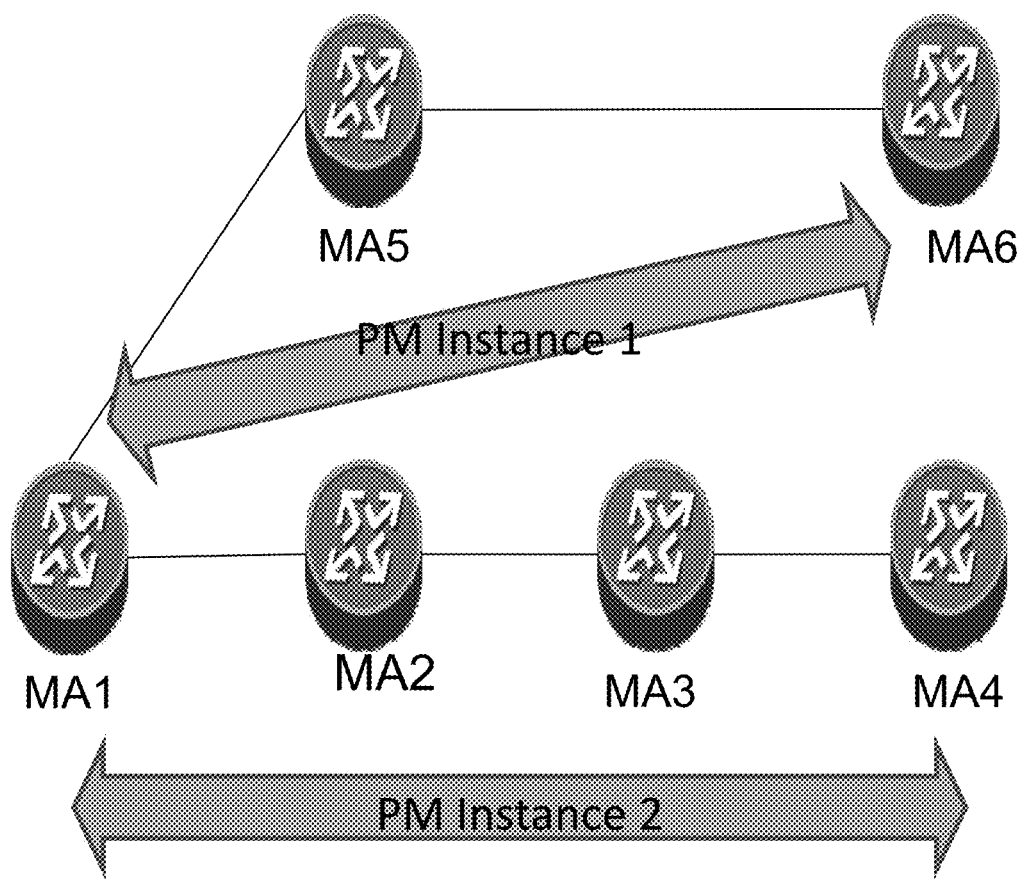
FIG. 3 illustrates the 2 PM instance associated with 2 network flows.
Figure 4:
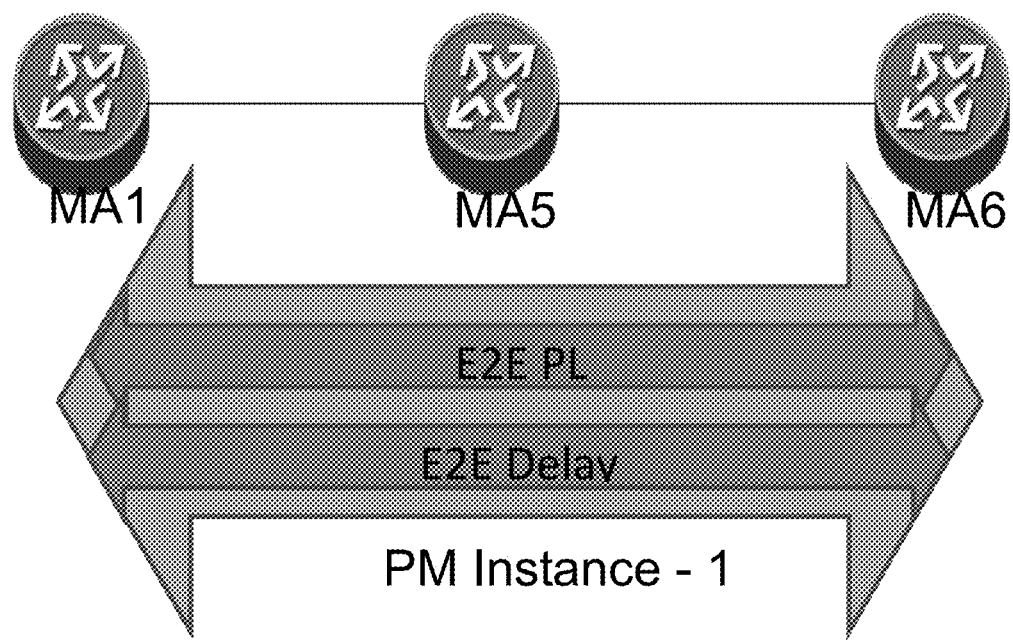
FIG. 4 illustrates the multiple PM type for a single segment.
Figure 5:
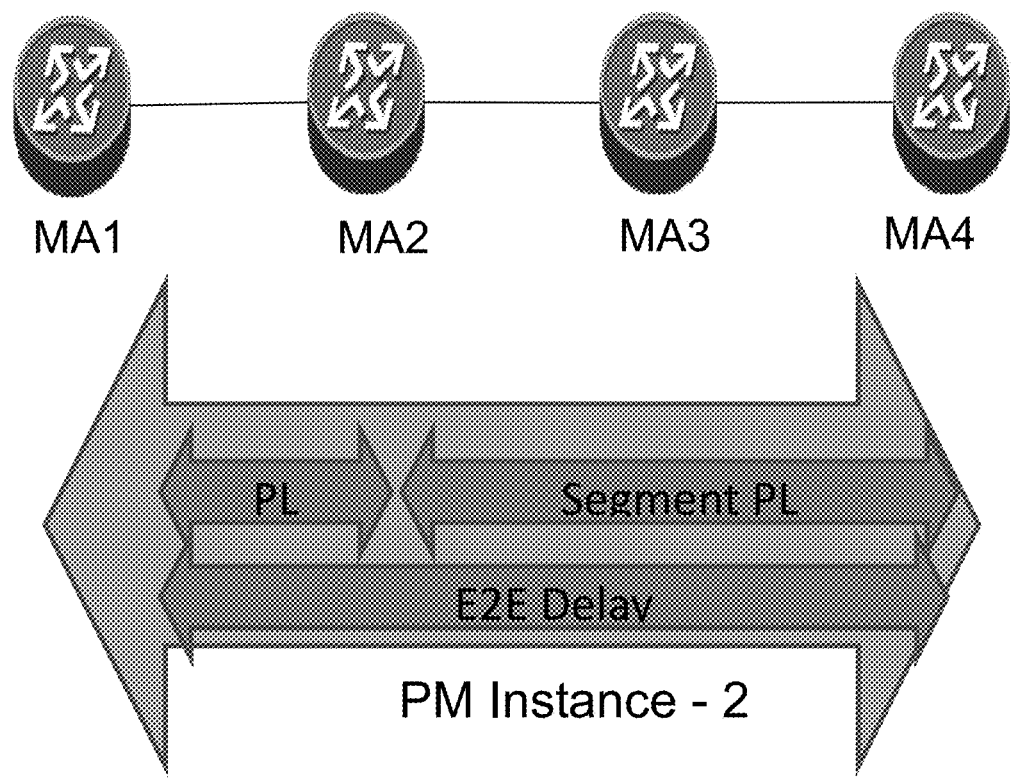
FIG. 5 illustrates the multiple segments for multiple PM type.

It may be understood by the person skilled in the art that a flow can be: a) LSP, or b) a service or a particular traffic within a service. The performance measurement may be carried out on a particular flow in the network called as performance instance. The PM Instance is programmed at the ingress. The PM instance may contain the flow identification for which PM has to be performed and PM Segment(s) having MA(s) with Role (Start, Intermediate or End) and PM type. Referring now to FIG. 2, the 2 LSPs with 2 different network flows is illustrated. Referring now to FIG. 3 the 2 PM instance associated with 2 network flows are illustrated. Referring now to FIG. 4 the multiple PM type for a single segment is illustrated. Referring now to FIG. 5, the multiple segments for multiple PM type is illustrated.

Referring again to FIG. 1, various operations performed by various components of the typical networks are as provided below:

Ingress Operations:
i. PM Instance Configuration/Programming at the Ingress: The PM instance may contain the flow identification for which PM has to be performed and PM Segment(s) having MA(s) with Role (Start, Intermediate or End) and PM type, and a block window. It may be understood by the person skilled in the art that the PM Instance Configuration/Programming can be done via Centralized Controller, could be manually configured or via other means.
ii. Flow identification at the Ingress: Flow Identification at Ingress may be achieved by using any standard implementation like ACL or any other existing flow identification technique.
iii. Piggy backing of PM information in the Flow Packet during the block window. The PMF identifier, the block identifier, the MA node and the role associated with the MA node with PM type is piggy backed in the data packet for passive OAM, and should be present in test packet for active OAM.

Figure 6:
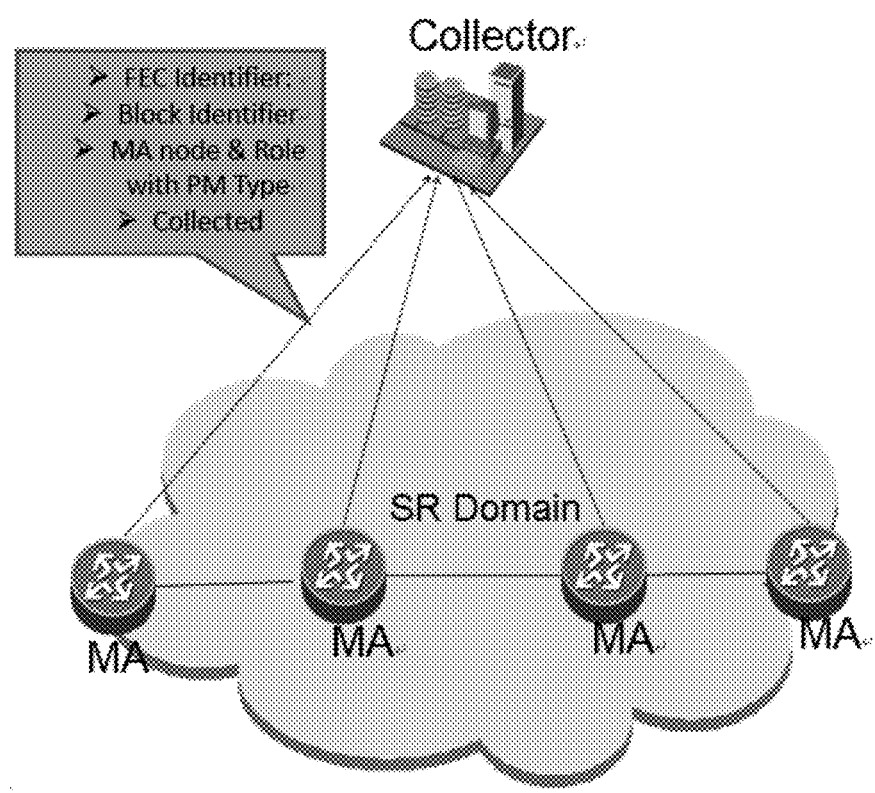
FIG. 6 illustrates collector statistics reporting.

MA Operation:
i. Detection of Metadata in a packet (This could be achieved via multiple mechanism, SR Service Label is one such mechanism)
ii. Processing of Metadata Information by Identification of its Role, performance measurement based on the identified role, accumulation of measured data for the keys obtained in metadata, and reporting of accumulated data at configured interval.
iii. The measurement data reporting to collector can be done via standard Protocols for performance metrics calculation.
iv. Referring now to FIG. 6, the collector statistics reporting is illustrated. The PMF identifier, block identifier, the MA node and the role associated with the MA node with PM type, and the collected statistics information is communicated from MA to collector.

The MA may not maintain the context of the block interval, the statistics information of a single block can be sent in more than one report, and the collector maps and accumulates the statistics of a block from different reports. Above MA steps are implicitly done at Ingress it may not requires detection based on metadata as the ingress is the one encapsulating metadata in the Packet.

Collector operation:
i. PM Data Co-Relation at Collector:
   a. Data reporting to collector from MA may be achieved via available standard mechanism such as IPFIX, NETCONF, etc. It is to be noted that, the transport mechanism of achieve the communication is out of the scope of the present disclosure and hence not discussed in greater details to avoid confusion and complexities in understanding the actual scope of the present disclosure.
   b. Collector uses the PMF Identifier to group statistics related to single flow. The collector may maintain the statistics related to a single flow from multiple MA to compute the PM of the flow.
   c. The collector uses the block identifier to map the statistics received from multiple MA to a specific flow interval.
   d. The MA reports the PM statistics info are regular interval, MA does not maintain the context of the block interval, the statistics information of a single block can be sent in more than one report, Collector maps and accumulates the statistics of a block from different reports.
   e. The collector performs the PM computations based on the type of PM statistics reported from the MA, the identification of PM segment is done in the collector, based on the PM types received from the segment end point MAs.
ii. PM computation at collector: Collector may be configured to perform PM computation selected from one way delay, two way delay, average delay, packet loss, average packet loss, throughput calculation.
   a. The packet loss computation: The collector obtains the transmitted and received packets/octets from each MA for a given PMF Identifier+Block Identifier. By comparing the transmitted and received packets/octets, the packet loss can be computed Packet Loss Transmitted Count−Received Count.
   b. The packet delay computation: The collector obtains the timestamp for transmitted and received packet from each MA for a given PMF Identifier+Block Identifier. By comparing the transmitted and received packet timestamp, the packet delay can be computed Packet Delay=Received Packet time−Transmitted Packet Time.

As compared to the conventional mechanism of performance measurement, the present disclosure provides performance measurement for segment routing with flexibility to have PM information either piggy backed to data packet itself thereby saving on bandwidth or dedicate PM packet avoiding change in data packet. A new PMF identifier is defined to be used by transit/egress nodes for statistics collection for a given PMF (can be applicable for SR-BE, SR-TE, P2P, P2MP, MP2MP services/LSPS). The PMF Identifier is carried in the piggy backed information without the use of separate SR label, thereby saving on the label space and reducing load due to label exchange. The present disclosure is configured for performance measurement for any given segment which can be discrete or continuous segments, or can be from any node to any node in the flow. The Piggy backed information carries the node information role of the node used by Transit Egress Nodes to collect statistics for a given PM segment. The present disclosure enables to collect statistics for multiple segments and multiple PM types using a metadata present in single received packet, saving bandwidth and making PM calculation fast and more accurate, rather than having 1 packet per PM segment/PM Type. The present disclosure provides the sufficient information to collector directly hence, the timer/configuration requirement per performance measurement instance from transit/egress node is avoided.

Also, the present disclosure provides realization using service function chaining, without affecting the current MPLS forwarding architecture. The present disclosure uses the SR service function label to indicate the presence of NSH metadata which is configured to carry the piggy backed PM information.

Figure 7:
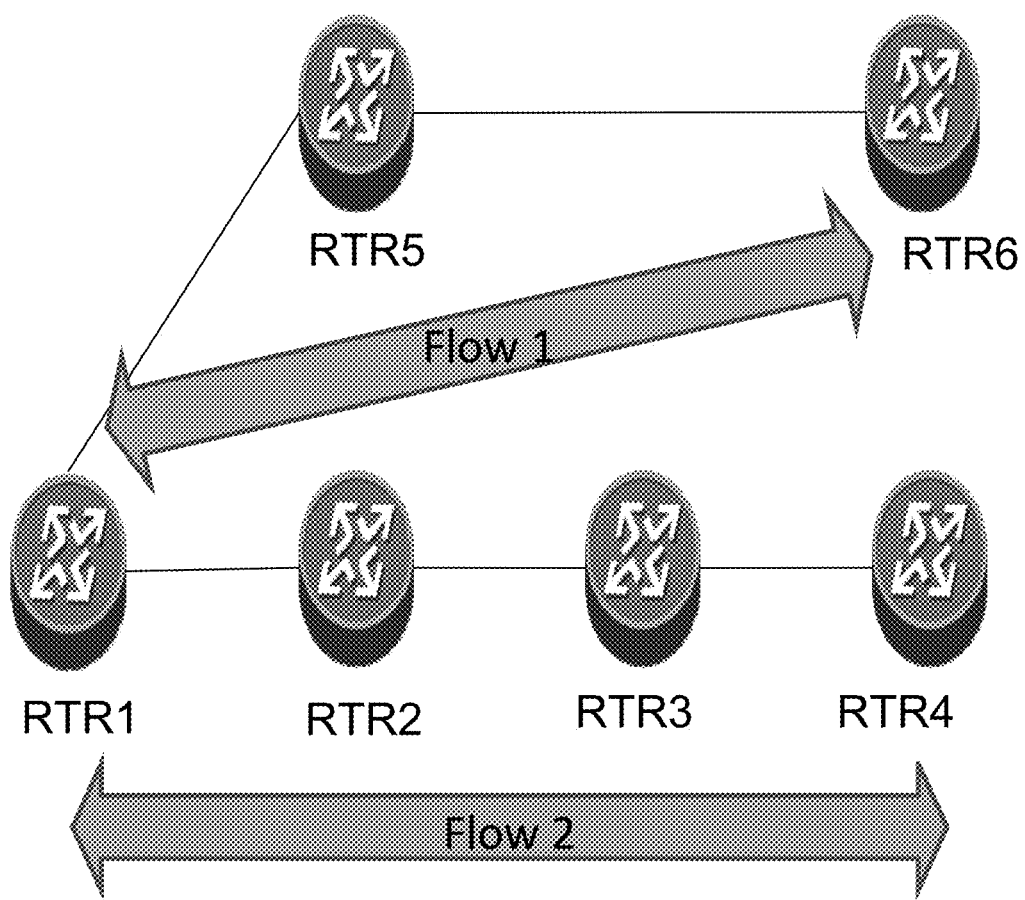
FIG. 7 illustrates flow identification.

In order to provide ease in understanding the present disclosure, the processing steps of the conventional performance measurement techniques is compared with the present disclosure. Referring now to FIG. 7, an exemplary flow identification for which the performance measurement is to be carried out is disclosed. As shown in the FIG. 7, the performance measurement has to be carried out for the two LSP. LSP1 is a MPLS LSP from Router-1 to Router-6. LSP2 is a MPLS LSP from Router-1 to Router-4.

Step 1: PM Instance Configuration/Programming at the Ingress:
For Example consider a scenario of 2 PM Segment PM Segment 1: From RTR1 to RTR4 and PM Segment 2: From RTR 2 to RTR4. The PM Segment is a Segment inside a flow for which performance measurement has to be carried out.

PM Segment 1 Details
RTR1—Start MA
RTR4—End MA
Type: Packet Delay
PM Segment 2 Details
RTR2—Start MA
RTR3—Intermediate MA
RTR4—End MA
Type: Packet Loss According to the present disclosure, the PM is defined for a particular SR. A PM segment may be configured for the PM Instance. The Segment may be from any node to any node in the flow for the PM instance. Further, the PM segment can be discrete or continuous segments.

Step 2: Ingress RTR1 Piggy Backed the PM information in the flow packet during the block window:

It may be understood by the person skilled in the art that, the piggy backing of information in flow data can be achieved via. Multiple mechanisms such as NSH based metadata. For above example as shown in FIG. 7, the PMF identifier, Block Identifier, and MA information may be piggy backed in flow packet for Segment 2, as shown in FIG. 2. For example, referring to FIG. 8, following information may be piggy backed:

PMF Identifier: LSP ID (of LSP from RTR1 to RTR4)
Block Identifier: X (for 1st block window, increase with every block window)
MA
  RTR2
    Start MA
    Packet Loss
  RTR3
    Intermediate MA
    Packet Loss
  RTR4
    End MA
    Packet Loss It may be understood by the person skilled in that art that for this example, RTR1 is not MA so it may not be collecting or sending any statistics information to collector. The SR Service Label may be used to detect the presence of Piggy backed information in packet this should be added by SR ingress. Any other means of piggy backed information detection may also be used.

According to the present disclosure, the performance measurement for SR having flexibility to have PM information is piggy backed to data packet itself thereby saving on bandwidth or in Dedicate PM packet avoiding change in data packet. The PMF Identifier used by Transit/Egress MA Nodes is introduced for statistics collection for a given PMF. This may be applicable for SR-BE, SR-TE, P2P, P2MP, MP2MP services/LSPS. The present disclosure enables to carry the PMF identifier in piggy backed information without the use of separate SR label, thereby saving on the label space and reducing load due to label exchange. The present disclosure enables to carry the MA node and the associated role in piggy backed information used by transit egress MA nodes to collect statistics for a given PM Segment.

Step 3: Packet Processing at MA:

According to the present disclosure the presence of piggy backed information is detected in the data packet. Once the metadata is detected it is processed and the role associated with MA is identified along with the PM type(s) to be measured. Based on the role and the PM type the MA Accordingly Collects the statistics against the Key (PMF Identifier+Block Identifier) obtained in packet.

Figure 8:
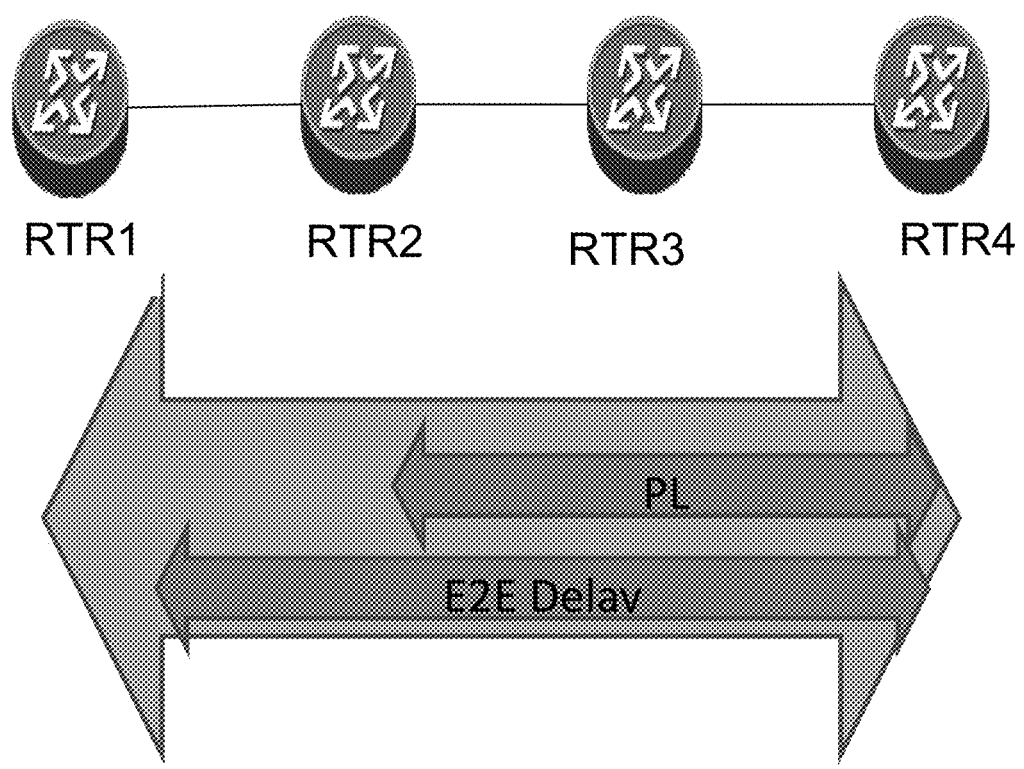
FIG. 8 illustrates segment inside a flow for which performance measurement has to be carried out.

In case on the example as shown in FIG. 8, the RTR2 detects the role as start MA and the PM type as packet loss. The RTR2 accumulates the packet count information against the Key (PMF Identifier+Block identifier) and the MA type and role. Similar collection is carried out at RTR3 and RTR4.

The step 3 of the present disclosure enable to achieve the collection statistics for multiple segments and multiple PM types using metadata present in single received packet, saving bandwidth and making PM calculation fast and more accurate, than having 1 packet per PM segment/PM Type. Further, the PM statistics is collected against the Key as PMF Id, Block Id & PM role with type.

Step 4: Packet Reporting by MA to Collector:

According to the present disclosure, the statistics of the performance measurement is reported periodically to the collector with the Key+MA information. The PM statistics may be reported to the collector with Key as PMF Id, Block Id and PM role with type.

In case on the example as shown in FIG. 8, the RTR2, RTR3 and RTR4 after the periodic timer expiry sends the accumulated packet count information to collector.

Step 5: Collection of Information at Collector:

According to the present disclosure, the collector receives and accumulates the statistics for following key PMF Id, Block Id and PM role with type.

The step 5 of the present disclosure enables the collector to collect and accumulate the statistics for a given Block, thereby removing the requirement of maintenance of timers at MA.

Step 6: Performance Measurement at Collector:

For example, the packet loss parameter of the performance measurement may be calculated using Packet Loss=Transmitted Count−Received Count. Similarly other parameters may also be calculated and customized based on the requirements of user or network.

In case on the example as shown in FIG. 8, the Collector obtains the packet Count of RTR2, RTR3 and RTR4. Packet loss between RTR2 to RTR3=Packet count at RTR2—Packet Count at RTR3. Packet loss between RTR3 to RTR4=Packet count at RTR3—Packet Count at RTR4.

Figure 9:
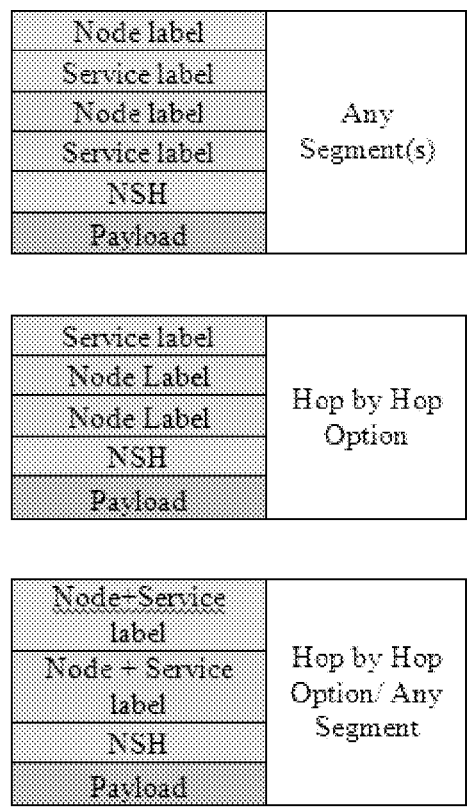
FIG. 9 illustrates the SR Service label implementation options with NSH Metadata, in accordance with an embodiment of the present subject matter.

In one implementation, the present disclosure may be implemented in various ways. One way of implementing the present disclosure is to carry the metadata in NSH of the packet. In order to achieve the present disclosure, the performance measurement is treated as one of the service function chaining (SFC) services. The nodes in the network which supports SFC and the present disclosure may be a candidate for this implementation and may act as MA. These MA nodes should act as a combination of SFF and SF. The NSH Metadata TLVs and Sub TLVs may be used to carry the PM parameters. The SR service label is used to indicate the existence of NSH Metadata in packet to MA. The SR service label location(s) and value depends on the desired measurement and device forwarding plane capability. Some of the SR Service label implementation options with NSH Metadata are as illustrated in FIG. 9.

Figure 10:
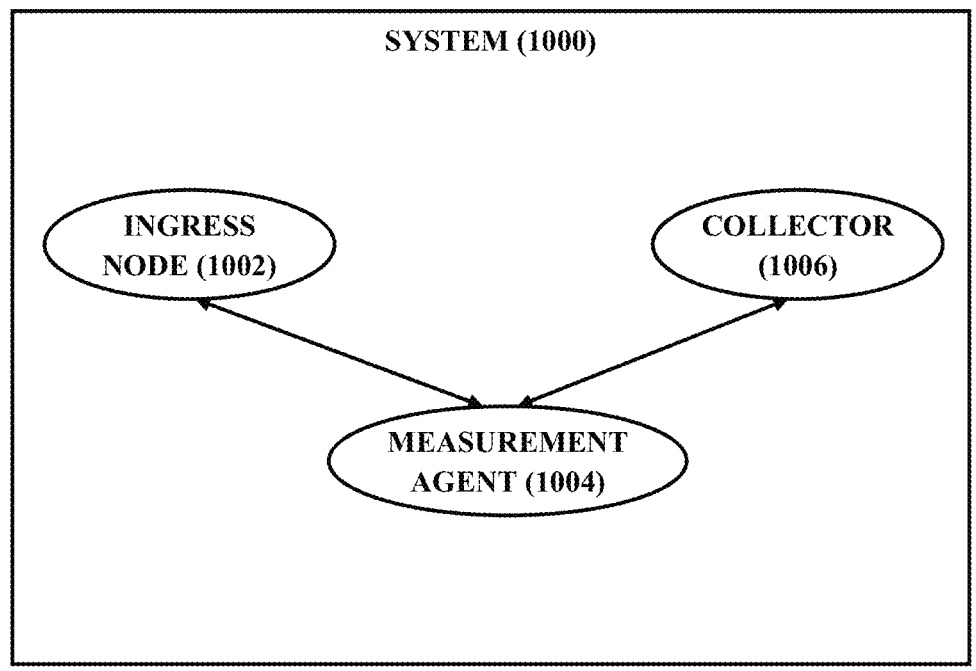
FIG. 10 illustrates a system, determining performance measures associated with at least one segment in respect of communication segments in a communication network, in accordance with an embodiment of the present subject matter.

Referring now to FIG. 10 a system 1000, determining performance measures associated with at least one segment in respect of communication segments in a communication network is illustrated, in accordance with an embodiment of the present subject matter. In one implementation, the system 1000 comprises at least one ingress node 1002, at least one the measurement agent 1004, and at least one collector 1006.

The ingress node 1002 is configured to define at least a performance measurement instance containing at least a flow for determining performance measures or at least one performance measurement (PM) segment of the flow in respect of the communication segments or both, piggy back data associated with the performance measurement (PM) segment in at least one packet, wherein the data contained in at least performance measurement metadata of the packet, the performance measurement metadata comprises at least a performance measured flow (PMF) identifier, or a block identifier, or at least one measurement agent details, or an associated role of the measurement agent with PM type, or a collected statistics information, or combination thereof; and transmit the packet containing the performance measurement metadata to the measurement agent (MA).

The measurement agent 1004 is configured to receive the packet containing the performance measurement metadata associated with the performance measurement (PM) segment, identify at least role of the measurement agent based on the performance measurement metadata received, execute the performance measurement based on the role identified, thereby collect statistics for the performance measurement (PM) segment of the flow, and at least one PM type based on at least the performance measurement metadata received, wherein the statistics is collected against at least one key selected from the PMF identifier or the block identifier or the associated role of the measurement agent with PM type, or the collected statistics information, or any combination thereof, received in the performance measurement metadata, and report the key and an information associated with the measurement agent to at least one collector.

The collector 1006 is configured to receive the key and the information associated with the measurement agent, and thereby collects and accumulates the statistics for at least measurement timeslot of a PM instance as specified in the key. The collector 1006 then determines the performance measures associated with the segment in respect of the communication segments based on the statistics collected and accumulated.

In one implementation, the measurement agent is further configured to detect the presence of the performance measurement metadata in the packet received.

In one implementation, the collector is further configured to group statistics associated with at least the segment received from the measurement agent based on at least the PMF identifier in the key received.

In one implementation, the collector is further configured to map the statistics associated with as specified in the key received from the measurement agent to a pre-stored/pre-determined statistics of the segment in respect of communication segment.

In one implementation, the collector is further configured to compute the performance measures based on at least the type of statistics reported from the MA, the computation is based at least on performance parameter selected from one way delay or two way delay or average delay or packet loss or average packet loss or throughput calculation or packet delay or any combination thereof.

In one implementation, the performance measurement segment is configurable for at least one performance measurement instance, wherein the PM segment is at least a discrete segment or a continuous segment.

In one implementation, the PMF identifier provides at least an identification of a performance measured flow within a network with value is measurement agent identifier in addition to service/LSP identifier.

In one implementation, the block identifier is an identifier for a block of packet obtained after dividing the flow into multiple blocks (measurement timeslot of a PM instance).

In one implementation, the measurement agent identifier and the associated role of the measurement agent is used to identify the MA for a particular flow with the roles and the type of performance measurement to be performed.

Figure 11:
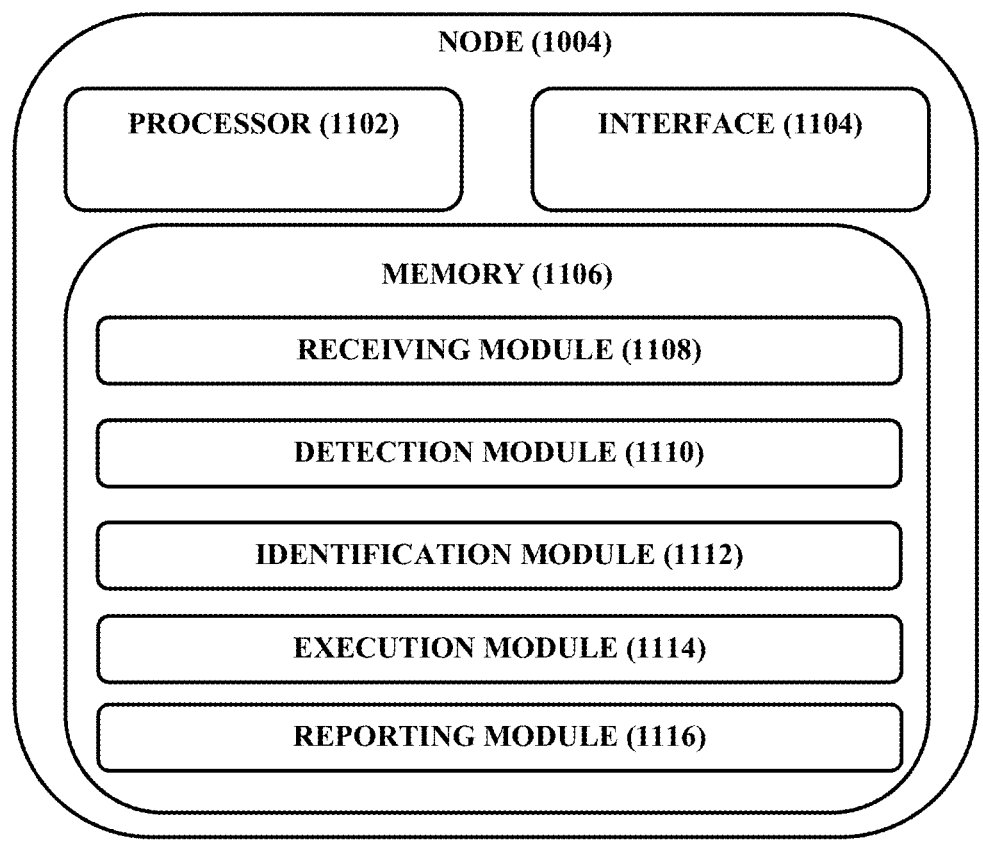
FIG. 11 illustrates a node for transmitting at least the data associated with the performance measurement (PM) segment selected from at least one segment in respect of communication segments in a communication network, in accordance with an embodiment of the present subject matter.

Referring now to FIG. 11 a node 1004 for transmitting at least the data associated with the performance measurement (PM) segment selected from at least one segment in respect of communication segments in a communication network is illustrated, in accordance with an embodiment of the present subject matter.

Figure 12:
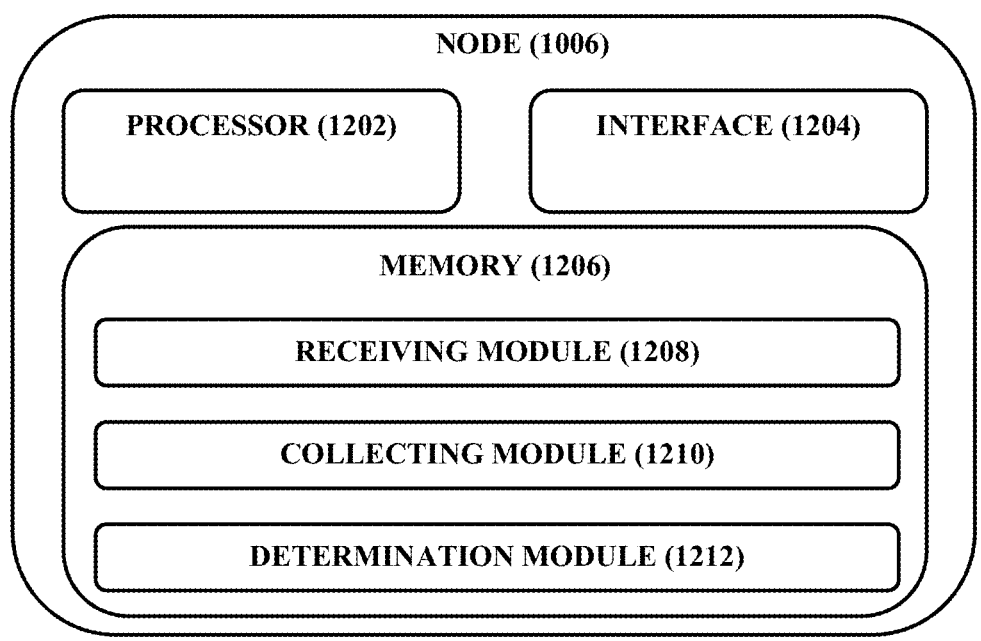
FIG. 12 illustrates a node for determining performance measures associated with at least one segment in respect of communication segments in a communication network, in accordance with an embodiment of the present subject matter.

Referring now to FIG. 12 a node 1106 for determining performance measures associated with at least one segment in respect of communication segments in a communication network is illustrated, in accordance with an embodiment of the present subject matter.

Although the present subject matter is explained considering that the present disclosure is implemented as nodes 1004 and 1006 in a system 1000 or a communication network, it may be understood that the as nodes 1004 and 1006 may also be implemented in a variety of computing systems, such as a laptop computer, a desktop computer, a notebook, a workstation, a mainframe computer, a server, a network server, and the like. It will be understood that the as nodes 1004 and 1006 may be accessed by multiple users, or applications residing on the as nodes 1004 and 1006. Examples of the as nodes 1004 and 1006 may include, but are not limited to, a portable computer, a personal digital assistant, a handheld device, sensors, routers, gateways and a workstation. The as nodes 1004 and 1006 are communicatively coupled to each other and/or other devices or a nodes or apparatuses to form a network (not shown).

In one implementation, the network (not shown) may be a wireless network, a wired network or a combination thereof. The network can be implemented as one of the different types of networks, such as GSM, CDMA, LTE, UMTS, intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network may include a variety of network devices, including routers, bridges, servers, computing devices, storage devices, and the like.

The nodes 1004 and 1006 as illustrated in accordance with an embodiment of the present subject matter may include a processor, an interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions or modules stored in the memory.

The interface (I/O interface) 1104 and/or 1204 may include a variety of software and hardware interfaces, for example, a web interface, a graphical user interface, and the like. The I/O interface may allow the nodes 1004 and 1006 to interact with a user directly. Further, the I/O interface may enable the nodes 1004 and 1006 to communicate with other devices or nodes, computing devices, such as web servers and external data servers (not shown). The I/O interface can facilitate multiple communications within a wide variety of networks and protocol types, including wired networks, for example, GSM, CDMA, LAN, cable, etc., and wireless networks, such as WLAN, cellular, or satellite. The I/O interface may include one or more ports for connecting a number of devices to one another or to another server. The I/O interface may provide interaction between the user and the nodes 1004 and 1006 via, a screen provided for the interface.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include plurality of instructions or modules or applications to perform various functionalities. The memory includes routines, programs, objects, components, data structures, etc., which perform particular tasks or implement particular abstract data types.

In one implementation, the present disclosure provides a node 1004 for transmitting at least the data associated with the performance measurement (PM) segment selected from at least one segment in respect of communication segments in a communication network. The node comprises a processor 1102, and a memory 1106 coupled to the processor 1102 for executing a plurality of modules present in the memory 1106. The plurality of modules comprises a receiving module 1108, detection module 1110, an identification module 1112, an execution module 1114, and a reporting module 1116.

The receiving module 1108 is configured to receive at least one packet, a detection module. The detection module 1110 is configured to detect presence of at least performance measurement metadata associated with the performance measurement (PM) segment, the performance measurement metadata comprises at least a performance measured flow (PMF) identifier, or a block identifier, or at least one measurement agent details, or an associated role of the measurement agent with PM type, or a collected statistics information, or combination thereof, contained in the packet. The identification module 1112 is configured to identify at least role of the node based on the performance measurement metadata detected. The execution module 1114 is configured to execute the performance measurement based on the role identified, thereby collect statistics for the performance measurement (PM) segment of the flow, and at least one PM type based on at least the performance measurement metadata received, wherein the statistics is collected against at least one key selected from the PMF identifier or the block identifier or the associated role of the measurement agent with PM type, or the collected statistics information, or any combination thereof, received in the performance measurement metadata. The reporting module 1116 configured to report the key and information associated with the node to at least one other node to determining performance measures associated with the segment in respect of communication segments in the communication network.

In one implementation, the performance measurement segment is configurable for at least one performance measurement instance, wherein the PM segment is at least a discrete segment or a continuous segment.

In one implementation, the PMF identifier provides at least an identification of a performance measured flow within a network with value is node identifier in addition to service/LSP identifier.

In one implementation, the block identifier is an identifier for a block of packet obtained after dividing the flow into multiple blocks (measurement timeslot of a PM instance).

In one implementation, the node identifier and the associated role of the node is used to identify the MA for a particular flow with the roles and the type of performance measurement to be performed.

In one implementation, the present disclosure provides a node 1006 for determining performance measures associated with at least one segment in respect of communication segments in a communication network. The node comprises a processor 1202 and a memory 1206 coupled to the processor 1202 for executing a plurality of modules present in the memory. The plurality of modules comprises a receiving module 1208, a collecting module 1210, and a determination module 1212.

The receiving module 1208 is configured to receive at least a key and a transmitting node details transmitting the data associated with the performance measurement (PM) segment selected from the segment, the key is at least a performance measured flow (PMF) identifier, or a block identifier, or at least one transmitting node details, or an associated role of the transmitting node with PM type, or a collected statistics information, or combination thereof. The collecting module 1210 is configured to collect and accumulate the statistics for a measurement timeslot of a PM instance as specified in the key. The determination module 1212 is configured to determine the performance measures associated with the segment in respect of the communication segments based on the statistics collected and accumulated.

In one implementation, the key comprises the statistics for the performance measurement (PM) segment of the communication segment.

In one implementation the node 1006 is further configured to group statistics associated with at least the segment from transmitting node based on at least the PMF identifier in the key received.

In one implementation the node 1006 is further configured to map the statistics associated with at least the segment from the transmitting node to a pre-stored/pre-determined statistics of the segment in respect of communication segment.

In one implementation the node 1006 is further configured to compute the performance measures based on at least the type of statistics reported from the transmitting node, the computation is based at least on performance parameter selected from one way delay or two way delay or average delay or packet loss or average packet loss or throughput calculation or packet delay or any combination thereof.

Figure 13:
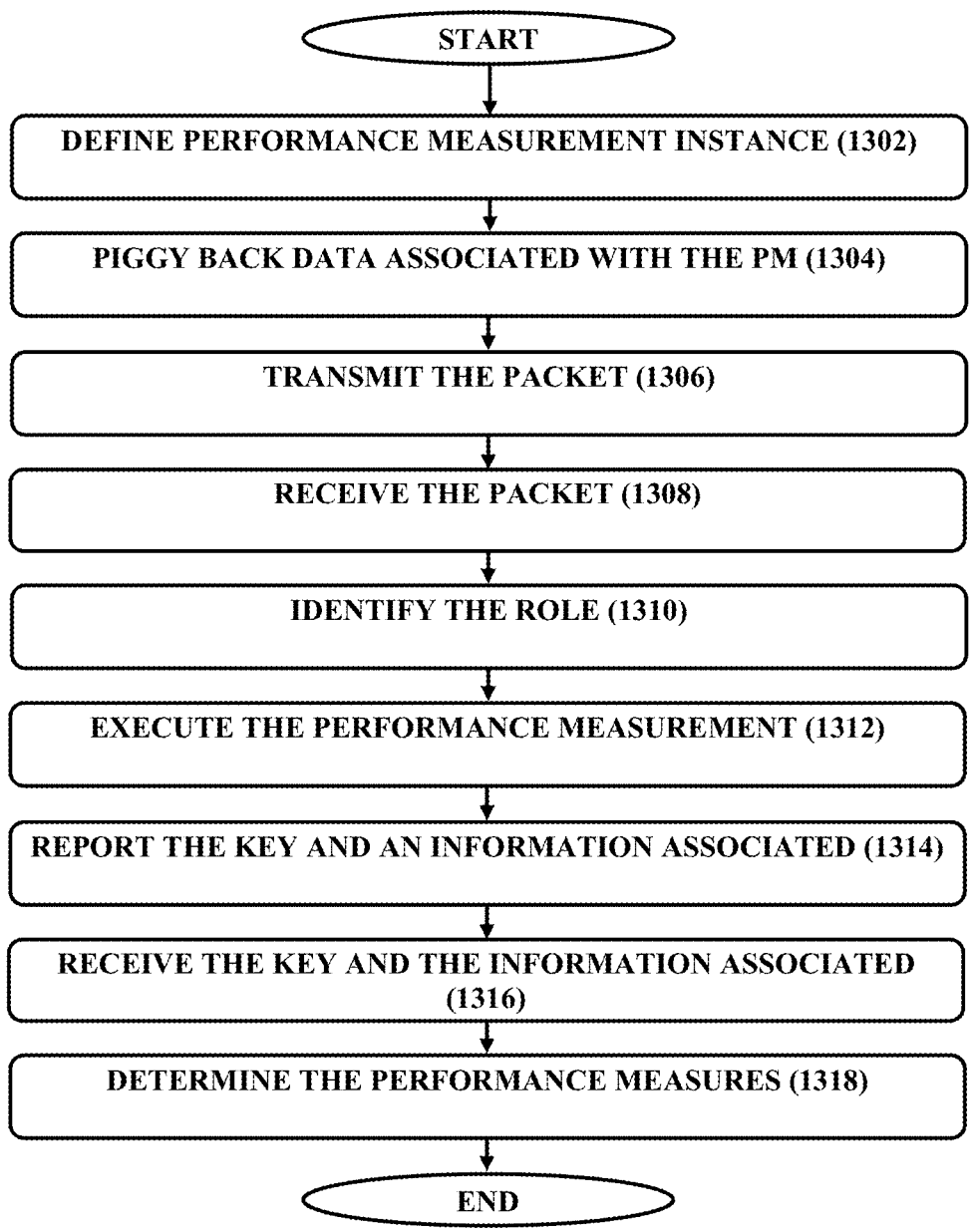
FIG. 13 illustrates a method of determining performance measures associated with at least one segment in respect of communication segments in a communication network, in accordance with an embodiment of the present subject matter.

In one implementation, the performance measurement segment is configurable for at least one performance measurement instance, wherein the PM segment is at least a discrete segment or a continuous segment FIG. 13, FIG. 14, and FIG. 15 illustrate various methods for the implementation of the present disclosure, in accordance with an embodiment of the present subject matter. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the method is described is not intended to be construed as a limitation, and any number of the described method blocks can be combined in any order to implement the method or alternate methods. Additionally, individual blocks may be deleted from the method without departing from the protection scope of the subject matter described herein. Furthermore, the method can be implemented in any suitable hardware, firmware, or combination of software and hardware. However, for ease of explanation, in the embodiments described below, the method may be considered to be implemented in the above described system 1000 or the nodes 1004 and/or 1006.

In one implementation, the present disclosure provides a method of determining performance measures associated with at least one segment in respect of communication segments in a communication network.

At block 1302, at least a performance measurement instance containing at least a flow for determining performance measures or at least one performance measurement (PM) segment of the flow in respect of the communication segments or both is defined by at least one ingress node 1002.

At block 1304, the data associated with the performance measurement (PM) segment in at least one packet is piggy backed by the ingress node 1002. The data is contained in at least performance measurement metadata of the packet, the performance measurement metadata comprises at least a performance measured flow (PMF) identifier, or a block identifier, or at least one measurement agent details, or an associated role of the measurement agent with PM type, or a collected statistics information, or combination thereof.

At block 1306, the packet containing the performance measurement metadata to at least one measurement agent (MA) 1004 is transmitted by the ingress node 1002.

At block 1308, the packet containing the performance measurement metadata associated with the performance measurement (PM) segment is received by the measurement agent (MA) 1004.

At block 1310, at least role of the measurement agent based on the performance measurement metadata received is identified by the measurement agent (MA) 1004.

At block 1312, the performance measurement based on the role identified, thereby collect statistics for the performance measurement (PM) segment of the flow, and at least one PM type based on at least the performance measurement metadata received is executed by the measurement agent (MA) 1004. The statistics is collected against at least one key selected from the PMF identifier or the block identifier or the associated role of the measurement agent with PM type, or the collected statistics information, or any combination thereof, received in the performance measurement metadata.

At block 1314, the key and information associated with the measurement agent 1004 is reported to at least one collector 1006.

At block 1316, the key and the information associated with the measurement agent 1004 is received by the collector 1006, and thereby collect and accumulate the statistics for at least measurement timeslot of a PM instance as specified in the key.

At block 1318, the performance measures associated with the segment is determined in respect of the communication segments based on the statistics collected and accumulated.

In one implementation a method, performed by at least one node 1004, for transmitting at least the data associated with the performance measurement (PM) segment selected from at least one segment in respect of communication segments in a communication network is disclosed.

At block 1402, at least one packet is received by the node 1004.

At block 1404, the presence of at least performance measurement metadata associated with the performance measurement (PM) segment is detected by the node 1004. The performance measurement metadata comprises at least a performance measured flow (PMF) identifier, or a block identifier, or at least one measurement agent details, or an associated role of the measurement agent with PM type, or a collected statistics information, or combination thereof, contained in the packet.

At block 1406, at least role of the node based on the performance measurement metadata detected by the node 1004.

At block 1408, the performance measurement based on the role identified is executed by the node 1004. The node 1004 thereby collect statistics for the performance measurement (PM) segment of the flow, and at least one PM type based on at least the performance measurement metadata received. The statistics is collected against at least one key selected from the PMF identifier or the block identifier or the associated role of the measurement agent with PM type, or the collected statistics information, or any combination thereof, received in the performance measurement metadata.

At block 1410, the key and information associated with the node is reported to at least one other node 1006 to determining performance measures associated with the segment in respect of communication segments in the communication network.

In one implementation, the performance measurement segment for at least one performance measurement instance is configurable. The PM segment is at least a discrete segment or a continuous segment.

In one implementation, the PMF identifier provides at least an identification of a performance measured flow within a network with value is measurement agent identifier in addition to service/LSP identifier.

In one implementation, the block identifier is an identifier for a block of packet obtained after dividing the flow into multiple blocks (measurement timeslot of a PM instance).

In one implementation, the node identifier and the associated role of the node is used to identify the node for a particular flow with the roles and the type of performance measurement to be performed.

In one implementation, a method, performed by at least one node 1006, for determining performance measures associated with at least one segment in respect of communication segments in a communication network is disclosed.

At block 1502, at least a key and a transmitting node details are received from at least one transmitting node 1004 by the node 1006. The key is at least a performance measured flow (PMF) identifier, or a block identifier, or at least one transmitting node details, or an associated role of the transmitting node with PM type, or a collected statistics information, or combination thereof At block 1504, the statistics for a measurement timeslot of a PM instance as specified in the key is collected and accumulated.

At block 1506, the performance measures associated with the segment in respect of the communication segments is determined based on the statistics collected and accumulated.

In one implementation, the key comprises the statistics for the performance measurement (PM) segment of the communication segment.

In one implementation, statistics associated with at least the segment from transmitting node are grouped based on at least the PMF identifier in the key received.

In one implementation, the statistics associated with at least the segment from the transmitting node are mapped to a pre-stored/pre-determined statistics of the segment in respect of communication segment.

In one implementation, the performance measures based on at least the type of statistics reported from the transmitting node are computed. The computation is based at least on performance parameter selected from one way delay or two way delay or average delay or packet loss or average packet loss or throughput calculation or packet delay or any combination thereof.

In one implementation, the performance measurement segment for at least one performance measurement instance is configurable. The PM segment is at least a discrete segment or a continuous segment.

Apart from what is explained above, the present disclosure also include the below mentioned advantages or the present disclosure enables to achieve:

- The performance measurement for packet loss, one way delay, two way delay and throughput measurement.
- Performance measurement for both active measurement and passive measurement i.e., performance measurement framework will have flexibility to carry performance measurement information within data packet or have dedicated PM control packet.
- Performance measurement for both E2E and Path Segment(s). In case of Path Segment, it can be Hop by Hop.
- Performance measurement for service and LSP.
- Performance measurement can be done for all LSP type like P2P, P2MP, and MP2MP.
- Performance measurement can be used both for continuous/proactive and selective/on-demand measurement.
- Performance measurement applicability to any Layer 3 technology like IPv4, IPv6 also should work for non IP Traffic like TDM traffic.
- Performance measurement will be LSP Agnostic, i.e., it should be able to work for any type of LSP including Best Effort, TE etc.
- Performance measurement will work for all standard LSP behaviors including PHP.
- Performance measurement will ensure Out of Ordering not impacting the PM Calculation especially for ECMP cases.
- The present disclosure is applicable to any MPLS Network A person skilled in the art may understand that any known or new algorithms by be used for the implementation of the present disclosure. However, it is to be noted that, the present disclosure provides a method to be used during back up operation to achieve the above mentioned benefits and technical advancement irrespective of using any known or new algorithms.

A person of ordinary skill in the art may be aware that in combination with the examples described in the embodiments disclosed in this specification, units and algorithm steps may be implemented by electronic hardware, or a combination of computer software and electronic hardware. Whether the functions are performed by hardware or combination of software and hardware depends on the particular applications and design constraint conditions of the technical solution. A person skilled in the art may use different methods to implement the described functions for each particular application, but it should not be considered that the implementation goes beyond the scope of the present disclosure.

It may be clearly understood by a person skilled in the art that for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiment of the present disclosure. The foregoing storage medium includes: any medium that can store program code, such as a USB flash drive, a removable hard disk, a read-only memory (ROM), a random access memory (RAM), a magnetic disk, or an optical disc.

Although implementations for systems, methods and nodes for performance measurement using segment routing have been described in language specific to structural features and/or methods, it is to be understood that the appended claims are not necessarily limited to the specific features or methods described. Rather, the specific features and methods are disclosed as examples of implementations of the system, method and node for performance measurement using segment routing.

What we claim is:

1. A node in a communication network, comprising:
   a memory storing instructions; and
   a processor coupled to the memory and configured to execute the instructions, which when executed by the processor, cause the node to:
   receive a packet comprising information associated with a performance measurement (PM) segment comprising at least one of a head node, an intermediate node or an end node;
   detect a presence of PM metadata associated with the PM segment in the packet, wherein the PM metadata comprises a key, wherein the key comprises at least one of a performance measured flow (PMF) identifier or a block identifier, and wherein the PMF identifier provides at least an identification of the PMF within a network;
identify, based on the PM metadata, a PM type to be measured and a role of the node in the PM segment; and
collect, based on the PM type to be measured and the role of the node in the PM segment, statistics for the PM segment of a flow against the key obtained based on the packet.

2. The node of claim 1, wherein the PM segment is configured for a PM instance, and wherein the PM segment is a discrete segment or a continuous segment.

3. The node of claim 1, wherein the PM metadata further comprises at least one of a measurement agent (MA) detail of a MA, an associated role of the MA with a PM type, or a collected statistics information.

4. The node of claim 1, wherein the block identifier comprises the identifier for a block of packets obtained after dividing the flow into multiple blocks of packets, wherein the block identifier divides the flow into the multiple blocks of packets, such that a first block of packets of the multiple blocks of packets has a same block identifier and consecutive blocks of packets of the multiple blocks of packets have different identifiers.

5. The node of claim 3, wherein the node identifier and the associated role identifies a first MA for a particular flow with roles and a type of PM to be performed.

6. A node for determining performance measures associated with at least one communication segment in a communication network and comprising:
a memory storing instructions; and
a processor coupled to the memory and configured to execute the instructions that when executed by the processor cause the node to:
receive a packet;
receive a key and transmitting node details from a transmitting node, wherein the transmitting node is associated with a performance measurement (PM) segment of the at least one communication segment, wherein the key is at least one of a performance measured flow (PMF) identifier or a block identifier, wherein the PMF identifier provides an identification of a performance measured flow within the communication network, and wherein the PMF identifier comprises a value that is equal to a value of a node identifier of the node and a service and label-switched paths (LSP) identifier;
collect statistics for a measurement timeslot of a PM instance as specified in the key; and
determine the performance measures associated with the at least one communication segment based on the statistics.

7. The node of claim 6, wherein the key comprises the statistics that correspond to the PM segment.

8. The node of claim 6, wherein the instructions further cause the node to group second statistics associated with the at least one communication segment that is received from the transmitting node based on the PMF identifier.

9. The node of claim 6, wherein the instructions further cause the node to map second statistics associated with the at least one communication segment from the transmitting node to pre-stored statistics of the at least one communication segment.

10. The node of claim 6, wherein the instructions further cause the node to determine the performance measures based on a type of statistics received from the transmitting node, wherein the performance measures are based on a performance parameter comprising at least one of a one way delay, a two way delay, an average delay, a packet loss, an average packet loss, a throughput calculation, or a packet delay.

11. A method implemented by a node in a communication network, wherein the method comprises:
receiving a packet comprising information associated with a performance measurement (PM) segment comprising at least one of a head node, an intermediate node or an end node;
detecting a presence of PM metadata associated with the performance measurement (PM) segment in the packet, wherein the PM metadata comprises a key, wherein the key comprises at least one of a performance measured flow (PMF) identifier or a block identifier, and wherein the PMF identifier provides at least an identification of the PMF within a network;
identifying, based on the PM metadata, a PM type to be measured and a role of the node in the PM segment; and
collecting, based on the PM type to be measured and the role of the node in the PM segment, statistics for the PM segment of a flow against the key obtained based on the packet.

12. The method of claim 11, further comprising configuring the PM segment for a PM instance, wherein the PM segment is a discrete segment or a continuous segment.

13. The method of claim 11, wherein the PM metadata further comprises at least one of a measurement agent (MA) detail of a MA, an associated role of the MA with a PM type, or a collected statistics information.

14. The method of claim 11, wherein the block identifier comprises an identifier for a block of packets obtained after dividing the flow into multiple blocks of packets, wherein the block identifier divides the flow into the multiple blocks of packets such that a first block of packets of the multiple blocks of packets has a same block identifier and consecutive blocks of packets of the multiple blocks of packets have different identifiers.

15. The method of claim 13, further comprising identifying, using a node identifier and the associated role, a first MA for a particular flow with roles and a type of PM to be performed.

16. A method implemented by a node for determining performance measures associated with at least one communication segment in a communication network, wherein the method comprises:
receiving a packet;
receiving a key and transmitting node details from a transmitting node associated with a performance measurement (PM) segment of the at least one communication segment, wherein the key is at least one of a performance measured flow (PMF) identifier or a block identifier, wherein the PMF identifier provides an identification of a performance measured flow within the communication network, and wherein the PMF identifier comprises a value that is equal to a value of a node identifier of the node and a service and label-switched paths (LSP) identifier;
collecting statistics for a measurement timeslot of a PM instance as specified in the key; and
determining the performance measures associated with the at least one communication segment based on the statistics.

17. The method of claim 16, wherein the key comprises the statistics that correspond to the PM segment.

18. The method of claim 16, further comprising grouping second statistics associated with the at least one communication segment that is received from the transmitting node based on the PMF identifier.

19. The method of claim 16, further comprising mapping second statistics associated with the at least one communication segment from the transmitting node to pre-stored statistics of the at least one communication segment.

20. The method of claim 16, further comprising determining the performance measures based on a type of statistics received from the transmitting node, wherein the performance measures are based on a performance parameter at least one of a one way delay, a two way delay, an average delay, a packet loss, an average packet loss, a throughput calculation, or a packet delay.

21. The node of claim 1, wherein the instructions further cause the node to report the key and information associated with the node to another node to determine performance measures associated with the PM segment.

22. The method of claim 11, further comprising reporting the key and information associated with the node to another node for determining performance measures associated with the PM segment.

* * * * *

UNITED STATES PATENT AND TRADEMARK OFFICE
CERTIFICATE OF CORRECTION

PATENT NO. : 11,044,187 B2  
APPLICATION NO. : 16/003632  
DATED : June 22, 2021  
INVENTOR(S) : Gauray Agarwal, Anil Kumar Srirangapatna Nagesh and Vinod Kumar Selvaraj Page 1 of 1

It is certified that error appears in the above-identified patent and that said Letters Patent is hereby corrected as shown below:

On the Title Page

Item (71) Applicant: "Guangdong (CN)" should read "Shenzhen, Guangdong (CN)"

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*